March 8, 1966
J. M. WHITE
3,239,064
FILTER WITH VAPOR BLEED MEANS
Filed Jan. 14, 1963
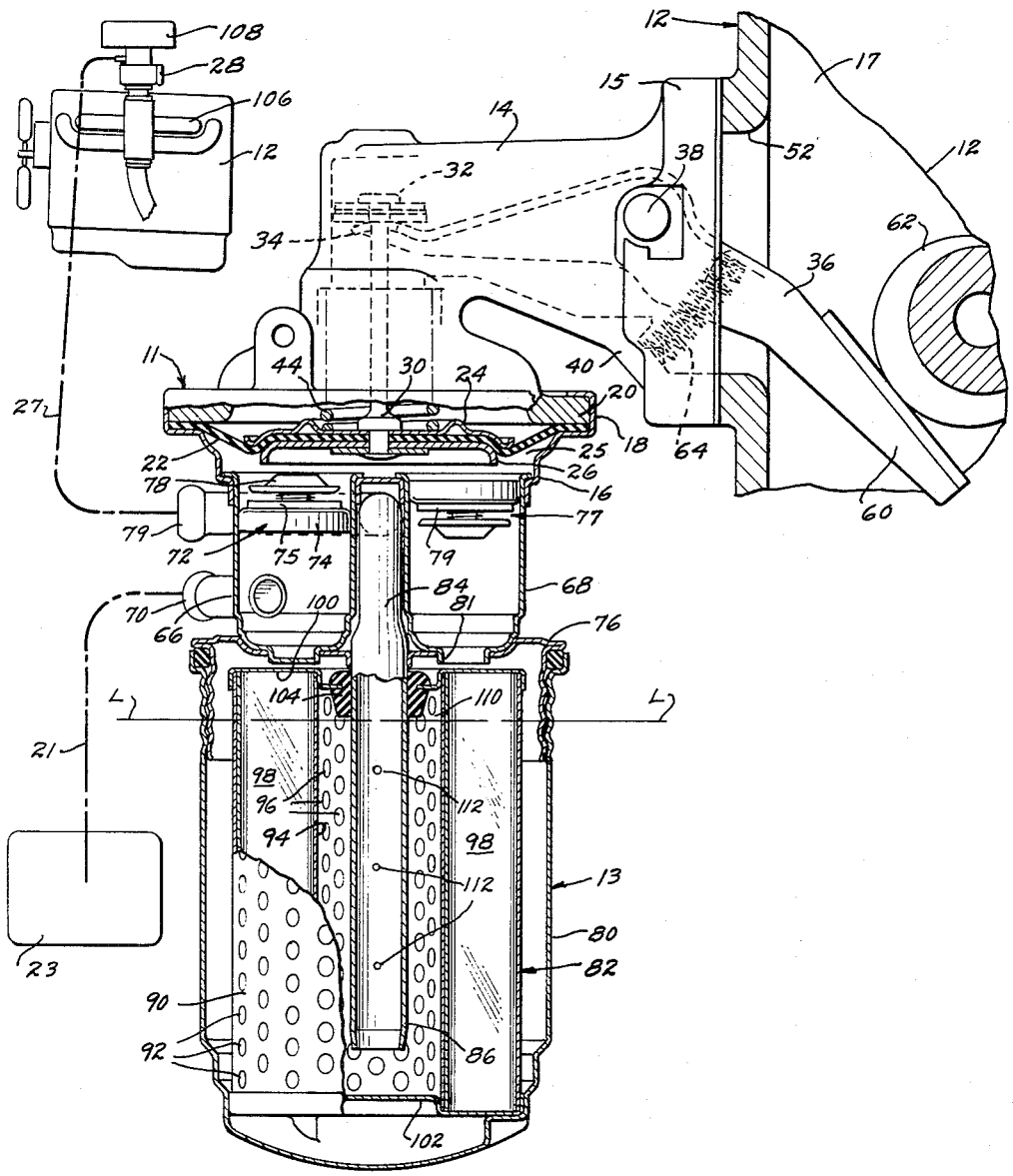
INVENTOR.
JACK M. WHITE
BY
AGENT

United States Patent Office 3,239,064
Patented Mar. 8, 1966

3,239,064
FILTER WITH VAPOR BLEED MEANS
Jack M. White, Florissant, Mo., assignor to ACF Industries Incorporated, New York, N.Y., a corporation of New Jersey
Filed Jan. 14, 1963, Ser. No. 251,348
2 Claims. (Cl. 210—436)

This invention relates to a filter construction for a fuel system used with internal combustion engines. The invention in particular is directed to means for alleviating vapor conditions within the fuel filter.

A type of fuel filter used in automotive fuel systems consists of a container having mounted centrally therein a cylindrical filter cartridge. Fuel enters the filter container around the filter cartridge and passes through the cartridge into a central region of the cartridge, from which it is conducted by fuel pressure into an outlet line to the carburetor of the automotive engine. Under certain circumstances, in which ambient temperatures are high, the fuel within the filter will tend to vaporize and pass as a vapor rapidly through the outlet conduit to the engine carburetor. Vapor, which travels to the carburetor as large bubbles, will pass quickly through the carburetor into the engine intake manifold and overly enrich the mixture. Such conditions are detrimental to engine operation during idling when an excessively rich air and fuel mixture will cause rough operation or even cause the engine to stop.

It is therefore an object of this invention to modify a fuel filter utilizing a filter cartridge to eliminate the passage of large amounts of vapor from the filter to the carburetor.

It is another object of this invention to provide a novel structure in a fuel filter utilizing a fuel cartridge to prevent excessive flow of vapor to the engine which would result in engine stoppage.

The invention consists primarily of the use of a standpipe tube within the central chamber of the filter cartridge which will limit the rate of flow of fuel vapor through the outlet passage to the carburetor to small amounts. The standpipe consists of an extension of the outlet conduit of the filter and is mounted substantially in a vertical position coaxial with the filter cartridge. Small apertures are formed along the length of the standpipe. Fuel vapor, which is formed within the central chamber of the filter cartridge will force the fuel level downwardly along the outside of the standpipe and as the fuel level uncovers each aperture in the standpipe, the aperture forms a restrictive vapor bleed into the standpipe. These apertures control the amount of vapor flow that can escape from the filter through the outlet conduit. This controlled vapor flow is not excessive to cause any detrimental effect to the operation of the engine particularly during idle operation.

The figure of this application shows a fuel system connected to an automotive engine with a fuel filter in section connected to a fuel pump partially in section.

The figure discloses a filter and fuel pump assembly in which the invention is incorporated. The assembly consists of a pump portion 11 fixed to a filter structure 13. The pump includes a lever housing 14 attached by a flange portion 15 to the crankcase 17 of an engine 12. Fuel is brought through a line 21 from a fuel tank 23 by the pump 11 and is forced through an outlet conduit 27 to a carburetor 28 mounted on the engine 12. The details of the pump do not constitute a part of this invention and accordingly all the pump parts are not fully described below. Fuel tank 23 and fuel lines 21 and 27 are only schematically indicated in the figure.

The pump portion 11 of the pump and filter assembly includes the pump spring housing 14 attached to a valve housing portion 16 formed of a sheet metal dished plate construction. The valve housing 16 has a rim 18 bent inwardly over a flanged end 20 of the spring housing 14. The peripheral edge of a circular flexible rubber-coated fabric pump diaphragm 22 is tightly gripped between rim 18 and flange 20 to seal diaphragm 22 to rim 18 in a fuel-tight manner. The central portion of the pumping diaphragm 22 is made sufficiently rigid by a pair of backing plates 24 and 26 on opposite sides of the diaphragm 22.

Backing plates 24 and 26 are tightly fixed together with the pumping diaphragm 22 in between by spinning over the end of a pump rod 30 extending through the several parts. The other end of rod 30 is formed with a nail head 32 which is fitted into the forked end 34 of an actuating lever 36, which in turn is mounted for pivotal movement on a bearing pin 38 journaled in the spring housing 14. A pump driving spring 44 is positioned between the upper surface of backing plate 24 and a shoulder of the spring housing 14.

Spring housing 14 is fixed across an opening 52 through the wall of the crankcase 17 of the engine 12 and may be attached to the crankcase by fastening the housing to studs extending through the flange portion 15 of housing 14 from the crankcase. The operating lever 36 has an end 60 extending through the opening 52 into the crankcase of engine 12 and into contact with an engine driven eccentric cam 62, as indicated. A spring 64 is tensioned between a portion of the housing extension 40 and the lever arm 36 to hold lever end 60 against cam 62.

During engine operation, the eccentric cam 62 is rotated and causes the pump operating lever 36 to oscillate back and forth. As viewed in the figure, the upward motion of the rocker arm end 34 pulls the pump rod 30 upwardly and tensions spring 44. Movement of operating lever 36 in a counterclockwise direction permits the spring 44 to press the pump rod and diaphragm 22 downwardly. The space between the bottom of valve housing 16 and the pump diaphragm 22 forms a pumping chamber 25.

Through the bottom of the valve housing plate 16 there is attached a pair of tubular cup members 66 and 68 formed of sheet metal. An inlet fitting 70 is fixed through the side wall of cup 66 leading to the inside of the cup. An inlet check valve assembly 72 is press-fitted or spot welded across the inside of cup 66 leading to the pumping chamber 25. The valve unit is formed by a supporting plate 74 having apertures therethrough and supporting a valve stop member 78. A valve washer 75 is positioned between the valve stop 78 and the upper surface of the valve support plate 74. The valve washer 75 extends over the inlet apertures in plate 74 to prevent fuel flow downwardly through the apertures from the pumping chamber 25. A light spring between the under surface of stop member 78 and the upper surface of washer 75 biases washer in position on plate 74. Details of the check valve assembly are disclosed and claimed in the copending application Serial Number 169,012 of Russell F. Smith, filed January 26, 1962.

A similar outlet valve assembly 77 is fixed across the inside of cup 68 in a turned-over position from that of valve assembly 72 to provide an outlet valve to the pumping chamber 25. The outlet valve assembly consists of similar parts shown for the inlet valve assembly 72 and includes an outlet valve washer 79.

A filter support structure 13 is formed with a downwardly facing sheet metal cup 76, and formed of sheet iron or steel, for example. The support structure is rigidly attached to the ends of cups 66 and 68 by being ring-soldered, for example. The rim of the support cup 76 is formed with a spiral corrugation to provide a screw threading to which is attached the upper rim of a filter cup 80 also formed of sheet metal and deep drawn to form a housing for a filter cartridge 82. An outlet pipe 84 is fitted through the center of the support cup 76 so that an inner end 86 extends down through the center of the filter cartridge 82. The upper end of outlet pipe 84 extends outward laterally between the two cups 66 and 68. Pipe 84 is metal and may be fixed by solder or brazing at the points where it passes through the plate 76 and where it contacts the cups 66 and 68. Such structure is not limiting as the outplet pipe 84 can be cast into any associated housing structure such as used with die cast pumps or filters. The closed end of cup 68 is apertured and drawn into a collar 81 extending through the bottom of suport cup 76 to provide a fuel passage from the interior of cup 68 into the top of the filter housing cup 80.

The filter cartridge 82 consists of an outer apertured cylinder 90 made, for example, of fiber board and having a large number of apertures 92 therethrough. A metallic cylinder 94 having apertures 96 therethrough is fixed coaxially within the center of the outer cylinder 90. Between the two cylinders is a paper filter element 98 consisting of an endless strip of filter paper positioned in closely spaced folds between the two cylinders 90 and 94, in a well-known manner. A pair of end plates 100 and 102 hold the two cylinders 90 and 94 in their proper spaced relationship with the filter element 98 therebetween. The plates 100 and 102 are sealed to the respective cylinders 90 and 94 and to the ends of the paper element 98 so that fuel flowing around the outside of cylinder 90 is forced to pass through the apertures 92 of cylinder 90, through the filter element 98 and into the hollow space formed by the inside of the apertured cylinder 94. A washer 104 formed of rubber or other fuel-resistant resilient material is tightly fitted through the central aperture of the upper plate 100. This washer fits around the outlet pipe 84, where it enters through the central aperture of plate 100 and forms a fuel-tight seal with the filter cartridge 82.

In operation, the upward stroke of diaphragm 22, as viewed in the figure, causes a low pressure to be formed in the pumping chamber 25. This is reflected in the cup 66 and fuel will be pressed by the atmospheric pressure from the tank 23 through the intake line 21 leading into cup 66. Fuel is sucked out of the cup 66 through the inlet valve assembly 72 and into the pumping chamber 25. On the downward stroke of rod 30, spring 44 presses the diaphragm downwardly and forces the fuel through the outlet valve assembly 77 into the cup 68 and through passage 81 into the filter housing 80. Fuel will flow over the top plate 100 and around the sides of the filter cartridge 90. Additional fuel flowing into the filter will force the fuel under pressure through the filter element 98 and into the hollow center of the filter cylinder 94. Fuel then flows from cylinder 94 through the outlet pipe 84 and the outlet fuel line 27 into the fuel bowl of carburetor 28.

Fuel lines 21, 27 and carburetor 28 are schematically shown in the figure, with the carburetor mounted on the manifold 106 of engine 12. The construction and operation of carburetor 28 is not a part of this invention and thus is not described in detail. However, it may be assumed that the carburetor is of a known design and one in which air is pumped through an air filter 108 to mix with the fuel from line 27 within the carburetor.

Air and vapor passing through the system become trapped under pressure in the upper region 110 of the cartridge cylinder 94 closed by end plate 100 and pipe 84. This trapped air and vapor provides a pulsation dampening airdome which helps to absorb the pulsations of the pump and provide a more even flow of fuel to the carburetor 28.

In fuel pump and filter assemblies of the type described and shown in the figure, and which have been sold commerically, the outlet pipe 84 normally terminated a short distance below the rubber washer 104 and slightly below the normal level of fuel in the filter, as represented by the line L. This design utilizing a short outlet pipe has proved to have disadvantages in operation when the ambient temperature is relatively high. Also, the filter 13 is normally mounted closely adjacent to the vehicle engine 12 and is thus exposed to considerable heat radiated from the engine in summer operation or when the engine is operated in hot desert or other hot climatic areas. Under such conditions, the fuel in the fuel supply system as well as in filter 13 tends to vaporize and form an adverse condition known as vapor-lock, in which abnormal amounts of fuel vapor are formed. Such a condition prevents proper operation of the fuel supply system to the engine and the engine itself.

One such vapor lock condition exists in the filter cup housing 80 where the fuel within the inner cylinder 94 of the filter cartridge vaporizes and accumulates at the upper portion of the cylinder in the region 110. If the engine is idling, and because of hot ambient conditions the engine becomes heated, the vapor condition in the region 110 of the filter becomes excessive. This excessive amount of vapor presses the fuel downwardly to the end of the short outlet pipe conventionally used. When the falling fuel level reaches the end of this short pipe, the vapor will surge into the pipe and through the conduit 72 to the carburetor. The vapor moves rapidly through the conduit and into the carburetor float bowl in large bubbles. The vapor quickly passes out of the fuel bowl through various vents into the mixture passage of the carburetor and down into the engine intake manifold, where immediately it forms with the little air present an overly rich mixture for the engine. Because the engine is operating at a slow speed, this excessively rich fuel mixture causes the engine to stall out immediately or cause rough idling conditions.

In accordance with the invention then, the outlet pipe 84 is extended, as shown in the figure, until its lower end 86 is close to the lower plate 102 of the filter cartridge. Along the length of the outlet pipe are provided several small orifices 112 in the order of 0.052 inch in diameter. These orifices are small enough to provide small restricted bleeds. As the vapor pressure builds up in the upper region 110 of the cylinder 94 and the fuel level L drops accordingly, the fuel vapor will slowly be bled through the first uppermost aperture 112 as it becomes uncovered by the falling fuel level in cylinder 94.

If the conditions are such that fuel vapor forms more rapidly than it can bleed away through the first aperture 112, the fuel level will continue to drop until the next lower aperture 112 is uncovered. Usually this provides sufficient bleeding to remove the fuel vapor as rapidly as it is being formed. The bleeding off of the fuel vapor slowly, in the manner described, through the orifices 112 allows the engine to receive the fuel vapor in small enough quantities, so that even during idling under excessively hot ambient temperatures the engine will not stall because of an overly rich fuel and vapor mixture in the intake manifold.

The outlet pipe portion 86 axially mounted within the filter cartridge cylinder 94 is shown as a pipe conduit structure integral with the outlet fitting 79. However, it is within the scope of this invention to provide a separate conduit portion 86 which can be press-fitted into an outlet pipe 84 or fastened by any other means.

The size of the orifices 112 have been given above as being in the order of 0.052 inch. This size, however, is not limiting and it is within the scope of the invention that any size may be utilized which performs the function of bleeding away the fuel vapor at a rate which will not adversely affect good engine operation. The particular filter and pump arrangement have been shown as an example in which the invention can be incorporated. However, it is also within the scope of the invention that the filter structure 13 may be quite separate and independent of the pump 11 and as such may be mounted in the conduit 27 between the pump and the carburetor 28. Furthermore, the scope of the invention would include the bleeding away of vapors within a filter cartridge quite irrespective of the particular shape of the filter structure. That shown in this application consists of a cylindrical filter which is adapted to be mounted with its axis vertically. However, the shape of the filter cartridge is not limiting and it is quite within the invention to utilize bleed tubes within other shapes of filter structures for bleeding off fuel vapors into the outlet line.

I claim:

1. A fuel filter assembly for filtering volatile fuel under pressure, comprising a filter structure having a closed chamber therein, a filter member arranged in said chamber, a fuel inlet for delivering fuel to said chamber under pressure for passage through said filter member, means forming a fuel outlet from said chamber for delivering fuel from said chamber downstream from said filter member, said means including a vertical pipe having one end connected to said outlet and the other end thereof open and positioned adjacent to the bottom of said chamber, said pipe having a portion extending from said other open end upwardly adjacent to the top of said chamber for connection with said fuel outlet, said pipe having a plurality of small vertically spaced restricted bleed orifices therethrough, the uppermost of said vertically spaced restricted bleed orifices being spaced from the top of said pipe and the lowermost vertically spaced restricted bleed orifice being spaced from the bottom of said pipe, whereby the lowering of the fuel level in said chamber due to the gradual accumulation of vapor will sequentially expose the vertically spaced restricted bleed orifices and permit the bleeding of the vapor into said pipe in proportion to the accumulation of vapor for mixing with the discharging fluid at spaced intervals in its flow.

2. The structure of claim 1 characterized in that said filter member is of cylindrical form and the pipe formed with the vertically spaced restricted bleed orifices is axially aligned centrally within said filter member.

References Cited by the Examiner
UNITED STATES PATENTS 2,588,519   3/1952   Guiot _____ 210—442 X
3,000,467   9/1961   Bowers.

REUBEN FRIEDMAN, *Primary Examiner.*

HARRY B. THORNTON, *Examiner.*